United States Patent Office 3,736,262
Patented May 29, 1973

3,736,262
COLLOIDAL COMPOSITION USEFUL AS VEHICLE FOR DIAGNOSTIC RADIOISOTOPES
Othel L. Pirtle, Jr., 2718 Stratford, Pearland, Tex. 77581
No Drawing. Filed Jan. 28, 1969, Ser. No. 794,809
Int. Cl. B01j 13/00; C01b 17/10
U.S. Cl. 252—313 R      8 Claims

ABSTRACT OF THE DISCLOSURE

A composition useful as a vehicle for diagnostic radioisotopes which comprises the colloidal composition resulting from mixing at elevated temperatures, water, an antimony salt of a polyhydroxy acid and ammonium sulfide. The diagnostic radioisotope is dispersed in the colloidal composition and adsorbed by the particles of such colloidal composition.

BACKGROUND OF THE INVENTION

The present invention relates to diagnostic compositions. More particularly, the present invention relates to compositions useful in diagnostic techniques wherein radioactive tracer materials are introduced into the body.

The use of radioactive materials such as technetium 99m, idoine 131, gold 198, and the like for diagnostic purposes has become a widely accepted and extremely useful means of determining the status of various organs within the body. In such diagnostic techniques, the radioactive material in admixture with various carrier vehicles is injected into the body and, depending upon particle size of the radioactive materials or the materials within the vehicle which become radioactive through adsorbing or otherwise combining with the radioisotope, the radioactive material comes to rest and concentrates in certain organs of the body. By observing the intensity and pattern of the radioactivity emitted from the organs in which the radioactive materials have become concentrated, a relatively accurate picture of such organ may be obtained. From such picture, the status and condition of such organ generally can be determined with considerable accuracy.

A number of colloidal compositions are known and employed as carrier vehicles for the radioisotopes utilized in this diagnostic technique. However, many of these colloidal compositions do not possess good stability and must be prepared, stored and utilized under rather narrowly controlled conditions to prevent precipitation of components therefrom or coagulation to a solid or semisolid. Additionally, many of the potentially useful compositions do not readily permit dispersion of the radioactive material therein. Also, with many of these known colloidal compositions, there is little or no latitude with respect to variation of particle size of suspended materials therein and therefore, such compositions cannot readily be employed for diagnosis of a variety of different body organs. In addition, as a result of the presence of sulfur, many of the otherwise more useful of the known carrier compositions have an odor which is offensive to all coming in contact with such compositions.

It is an object of the present invention to provide new and novel diagnostic compositions.

Another object of the present invention is to provide new and novel compositions particularly useful as vehicles for dispersing therein radioisotopes of the type employed in medical diagnosis.

Still another object of the present invention is to provide new and novel diagnostic compositions having dispersed therein a diagnostic radioisotope, which compositions may be prepared, stored and utilized over a relatively wide range of conditions without the occurence of precipitation or coagulation.

An additional object of the present invention is to provide new and novel colloidal compositions useful as vehicles for diagnostic radioisotopes, which compositions may have the particle size of the materials dispersed and suspended therein varied, thereby permitting use of such compositions in diagnosing a variety of different body organs.

A remaining object of the present invention is to provide a new and novel sulfur containing colloidal diagnostic composition which is free of offensive odors.

Additional objects will become apparent from the following description of the invention herein disclosed.

SUMMARY OF THE INVENTION

The present invention which fulfills these and other objects, is a composition produced by the mixing together at elevated temperatures of ammonium sulfide with an antimony salt of a polyhydroxy acid in the presence of water. To further aid in maintaining stability of this composition under widely varying conditions, it frequently is desirable to include within the composition certain hydrophillic compounds. The diagnostic radioisotopes are dispersed within the composition of the present invention for injection into the body for diagnostic purposes.

The compositions of the present invention are very clear, generally having a yellow to orange color, and are readily syringable and injectable into the body. These compositions are relatively more stable than many other conventional, known vehicles of similar utility and may be prepared, stored and used under a wide range of conditions without precipitation or coagulation. Additionally most diagnostic radioisotopes are readily dispersable within the present compositions. Also, by varying conditions of preparation, the particle size of the materials suspended in the present colloidal composition may be varied to thereby permit deposition and concentration of the diagnostic radioisotope carried by the composition in different organs of the body. In addition, the present compositions, though containing sulfur, are free of the offensive odor found in similar known sulfur containing compositions.

DESCRIPTION OF THE PREFERRED EMBODIMENTS OF THE PRESENT INVENTION

The antimony salts of polyhydroxy acids useful in preparing the present compositions include the salts of acids having the general formula $$R—(R^1)_x—(CHOH)_y—COOH$$

wherein R is hydrogen or a carboxylic radical, $R^1$ is a methylene radical or a dihydroxy substituted carbon radical, $x$ is a number of from 0 to 5 and $y$ is a number from 2 to 10 and wherein the total number of carbon atoms does not exceed 15. Most useful are the polyhydroxy dicarboxylic acids of the general formula $$HOOC—(CHOH)_y—COOH$$

wherein $y$ is a number from 2 to 8. The polyhydroxy acid is one having at least three adjacent hydroxy groups as substituents to adjacent carbon atoms. Preferably, these acids are polyhydroxy dicarboxylic acids of 4 to 8 carbon atoms. A particularly useful salt of antimony is the antimony salt of tartaric acid.

The antimony salts of the polyhydroxy acids may include elements other than antimony as substituents such as the alkali and alkaline earth metals, and the like. Generally such elements have replaced hydrogen in one of the hydroxy groups, preferably within a terminal carboxylic radical if the acid is a dicarboxylic acid. Such metals as the alkali and alkaline earth metals, i.e., sodium, potassium, lithium, calcium, magnesium, and the like, readily substitute into such hydroxy radicals. Among the particularly useful antimony salts employed in the present compositions are the sodium and potassium antimony tartrates, particularly the potassium antimony tartrate.

In preparing the compositions of the present invention, it is desirable to avoid the use of an excess of ammonium sulfide. Therefore, the ammonium sulfide usually is employed in no greater than the stoichiometric quantity. Generally, the amount of ammonium sulfide used in preparing the present compositions does not exceed that which will result in a molar ratio of ammonium sulfide to antimony salt of no greater than 1.5:1. Within these limits, the amount of ammonium sulfide employed may vary quite widely. A particularly useful amount is that which will result in a mole ratio of ammonium sulfide to antimony salt within the range of 0.05:1 to 1:1, preferably within the range of 0.1:1 to 0.5:1.

Water may be employed in the preparation of the present compositions in widely varying amounts and generally is the major constituent being present in amounts in excess of 50 weight percent of the total composition. The ammonium sulfide usually is introduced into reaction as an aqueous solution. In like manner, the antimony salt is added to the reaction as an aqueous solution. All of the water may be introduced into the reaction mass by the bringing together of these aqueous solutions or the aqueous solutions of ammonium sulfide and antimony salt may be individually added to a quantity of water. Usually, the amount of water employed without regard to source in preparing the compositions of the present invention will be in excess of 75 weight percent of the total composition and preferably, will be in excess of 90 weight percent of the total composition. While formation of the compositions of the present invention does not require a highly purified water, it is generally desirable to use such a purified water in view of the utility of these compositions for injection into the body.

As noted above, it frequently is desirable to provide additional stability to the compositions of the present invention in order that they may have wider applicability and be employed under more widely varying conditions. Particularly useful in such further stabilization of the present compositions are such hydrophilic compounds as polyvinylpyrrolidone, polyvinylpyrrolidinone, polyvinyl alcohol and the like. Other hydrophilic compounds such as the alkyl-phenol and fatty alcohol-ethylene oxide condensation products, various sulfonates such as alkyl sulfonates, alkylaryl sulfonates, and the like may also be employed to add stability to the present compositions. Also, such materials as the low viscosity alkaline salts of carboxymethylcellulose such as sodium carboxymethylcellulose may be employed as stabilizing agents. A preferred stabilizing compound for addition to the present compositions is polyvinylpyrrolidinone. The stabilizing compound added, preferably, is of pharmaceutical grade, non-toxic, inert and capable of being sterilized without change in composition.

The amount of the stabilizing compound added to the present compositions seldom will exceed 10 weight percent of the total composition and more often will be less than 5 weight percent. With the preferred polyvinylpyrrolidinone and polyvinyl alcohols, the amount of stabilizing compound is usually less than 2 weight percent of the total composition. As with the ammonium sulfide and the antimony salts, the stabilizing compounds are usually introduced into the composition as an aqueous solution of the stabilizing compound.

The method of preparing the compositions of the present invention involves the mixing together of the antimony salt and the ammonium sulfide in the presence of the above defined amounts of water and at elevated temperatures. In a preferred manner of carrying out such mixing, an aqueous solution of the antimony salt is heated to the desired temperature and an aqueous solution of ammonium sulfide added. Formation of the compositions of the present invention begins almost immediately and progresses rapidly to conclusion as is indicated by a very clear appearance but with a pronounced orange to yellow coloration. To insure complete utilization of the reactants in forming the compositions of the present invention, it is usually desirable to continue the elevated temperatures of the reaction mass for a short period of time, i.e., one-half to five minutes after addition of the ammonium sulfide.

Methods other than the above described preferred method of forming the compositions of the present invention may also be employed. For example, the converse of such preferred method may be used. That is, an aqueous solution of the ammonium sulfide may be raised to the desired elevated temperatures and an aqueous solution of the antimony salt then added. Another method involves the mixing of the antimony salt and the ammonium sulfide at ambient temperatures followed by raising the temperature to an elevated temperature. This latter method has the disadvantage that formation of the compositons of the present invention begins at low temperatures which results in a relatively large particle size for the suspended materials of the colloid thus limiting utility thereof. However, should it be desired to form the present colloidal compositions with large particle size suspended materials then this method is useful.

As indicated above, the particular elevated temperatures at which the colloidal compositions of the present invention are formed are important in determining the size of the particles of material suspended therein upon formation of the compositions. Lower temperatures favor larger particles while, conversely, higher temperatures favor smaller particles. This particle size is of importance to the particular application to be made of the present compositions. The organs of the body vary with respect to the size of particles which are permitted to pass therethrough. Thus, if it is desired to diagnose the liver by the deposition of radioactive materials therein, then the particles of the composition carrying the radioactivity must be of a size which will not pass through the liver but will be retained therein. If it is desired to diagnose the lungs, then a different and larger particle size is required. Generally, temperatures employed in forming the present compositions range just above ambient temperatures to the temperatures required to bring the reaction mass to a vigorous boil. The precise temperature used will depend upon the particle size desired for the suspended materials of the present colloidal compositions and may be readily determined by those skilled in the art in view of the teachings herein. In the particularly useful application of the present compositions as a carrier vehicle for technetium 99m in the diagnosis of the liver and spleen, the compositions are formed under temperature conditions such as to bring the reactant mass to the boiling point.

In preparing the colloidal compositions of the present invention for use as carriers for diagnostic radioisotopes, the diagnostic radioisotope is admixed with the present compositions which in most instances have been previously sterilized and then the resulting mixture heated. The mixing is carried out under conditions suitable for complete dispersal of the radioisotope which, generally, is satisfactorily accomplished by rapidly shaking or stirring the radioisotope and the present compositions together until visual uniformity is obtained. This mixture is then heated to a suitable temperature, preferably near or above the boiling point of the mixture. The resulting composition is then ready for injection.

As indicated above, a particularly preferred application of the present invention is in the admixture of the colloidal compositions of the present invention with technetium 99m for injection into the body for diagnosis of the liver and spleen. Such mixtures have been found to be particularly useful for diagnosis of these organs.

To further describe the preferred embodiments of the present invention, the following examples are presented.

EXAMPLE 1

Approximately 40 milliliters of a 1 percent potassium antimony tartrate solution was added to 200 milliliters of purified water. The resulting mixture was then heated to its boiling point and 2.5 milliliters of an ammonium sulfide solution added. The ammonium sulfide solution was one prepared by adding 0.1 milliliter of aqueous 25 percent ammonium sulfide to 2.5 milliliters of water. The resulting mixture was allowed to cool to ambient temperatures (70 to 75° F.). To this composition was then added 20 milliliters of an aqueous 3 percent polyvinyl pyrrolidinone solution.

The composition, as prepared above, was found to be extremely clear and to have a deep yellow-gold color. This composition was passed through a 0.45 micron millipore filter without any trace of a deposit on the filter. Samples of the composition were placed in bottles, stoppered and sealed and then were sterilized by autoclaving at 20 p.s.i.g. for 30 minutes. No change in the clarity, color and apparent uniformity of the composition was observed.

EXAMPLE 2

An aqueous solution of potassium antimony tartrate made up of 600 milliliters of purified H₂O and 120 milliliters of an aqueous 1 percent potassium antimony tartrate solution were heated to boiling. To the boiling mixture was added 0.3 milliliter of an aqueous 25 percent ammonium sulfide solution. Additionally, 600 milliliters of an aqueous 3 percent polyvinyl pyrrollidinone solution were added to the resulting mixture while such mixture was still boiling. The entire mixture was then allowed to boil for an additional 3 minutes and then cool back to ambient temperatures (72 to 75° F.).

This composition formed instantly upon the addition of ammonium sulfide as was indicated by the mixture turning a deep yellow-orange color. No trace of hydrogen sulfide odor was found in the resulting product. The pH of the composition was found to be approximately 6.5.

EXAMPLE 3

A potassium antimony tartrate solution prepared by adding 20 milliliters of aqueous 1 percent potassium antimony tartrate solution to 100 milliliters of water was raised to its boiling point. To this was added 1.25 milliliters of ammonium sulfide solution prepared by adding 0.1 milliliter of aqueous 25 percent ammonium sulfide to 2.5 milliliters of water. A deep yellow color appeared almost instantly. The mixture was boiled for a short period of time and then allowed to cool back to ambient temperatures of 70 to 75° C. There was no detectable odor from the composition. Its pH was found to be between 6 and 7 and it was found to pass readily through a 0.45 micron millipore filter.

To demonstrate the stability of the present composition, 0.2 milliliter of the above described aqueous 25 percent ammonium sulfide was added to 5 milliliters of the composition prepared as above described. No precipitate formed and no visible change appeared. The same result was obtained when 5 milliliters of an aqueous 1 percent potassium antimony tartrate was added to 5 milliliters of the present composition.

EXAMPLE 4

A colloidal composition was prepared by mixing together at ambient temperatures (72–75° F.) 100 milliliters of purified water, 20 milliliters of a 2% aqueous potassium antimony tartrate solution and 0.1 milliliter of an aqueous 25 percent ammonium sulfide solution. This mixture was heated to a temperature of approximately 95° C. and then allowed to cool back to ambient temperatures. To the colloidal composition so produced was added 10 milliliters of an aqueous 3 percent polyvinylpyrrolidinone solution. It was found that this colloidal composition which formed at temperatures below the boiling point would not pass through a 0.47 micron millipore filter.

What is claimed is:

1. A colloidal composition prepared by mixing together at elevated temperatures (1) water, (2) an antimony salt of a polyhydroxy acid having the formula $$R-(R^1)_x-(CHOH)_y-COOH$$

wherein R is hydrogen or a carboxyl radical, R₁ is a methylene radical or a dihydroxy substituted carbon, $x$ is a number of from 0 to 5 and $y$ is a number from 2 to 10, and (3) ammonium sulfide, said elevated temperatures being at the boiling point of the mixture and being maintained for at least ½ minute beyond addition of said ammonium sulfide, said ammonium sulfide and antimony salt being mixed in a molar ratio of no greater than 1.5:1.

2. The composition of claim 1 wherein the antimony salt of a polyhydroxy acid is the salt of an acid having the general formula $$HOOC-(CHOH)_y-COOH$$

wherein $y$ is a number from 2 to 8.

3. The composition of claim 1 wherein the antimony salt of a polyhydroxy acid is an alkali metal antimony tartrate.

4. The composition of claim 1 wherein said molar ratio is within the range of 0.05:1 to 1:1.

5. The composition of claim 1 wherein the amount of said water mixed is in excess of 75 weight percent of said composition.

6. The composition of claim 1 wherein the amount of said water mixed is in excess of 90 weight percent of said composition.

7. The composition of claim 1 wherein a hydrophillic stabilizing compound is added in an amount no greater than 10 weight percent of the total resulting mixture.

8. The composition of claim 7 wherein said hydrophillic stabilizing compound is one selected from the group consisting of polyvinylpyrrolidone, polyvinylpyrrollidinone and polyvinyl alcohols and wherein such compounds comprise less than 2 weight percent of the total resulting compositions.

References Cited

UNITED STATES PATENTS

| | | | |
|---|---|---|---|
| 2,281,784 | 5/1942 | Mohr | 424—164 X |
| 2,281,786 | 5/1942 | Mohr | 424—164 X |
| 2,448,740 | 9/1948 | Schwartz | 252—313 |
| 2,978,428 | 4/1961 | Aberegg | 252—313 X |

RICHARD D. LOVERING, Primary Examiner

U.S. Cl. X.R.

252—184; 424—1, 131, 164